(12) United States Patent
Breith et al.

(10) Patent No.: US 8,527,085 B2
(45) Date of Patent: Sep. 3, 2013

(54) METHOD FOR OPERATING A GEAR GRINDING MACHINE

(75) Inventors: Thomas Breith, Kempten (DE); Manfred Zankl, Oberguenzburg (DE)

(73) Assignee: Liebherr Verzahntechnik GmbH, Kempten (DE)

( * ) Notice: Subject to any disclaimer, the term of this patent is extended or adjusted under 35 U.S.C. 154(b) by 857 days.

(21) Appl. No.: 12/378,912

(22) Filed: Feb. 20, 2009

(65) Prior Publication Data

US 2009/0227182 A1     Sep. 10, 2009

(30) Foreign Application Priority Data

Feb. 21, 2008   (DE) .......................... 10 2008 010 301

(51) Int. Cl.
*G06F 19/00*     (2011.01)
(52) U.S. Cl.
USPC ................. 700/164; 451/5; 451/47; 451/177; 451/253; 451/443
(58) Field of Classification Search
USPC ......... 451/5, 47, 56, 177, 253, 443; 700/160, 700/164; 29/28; 65/61; 106/757; 125/11.19; 264/655; 430/137.18; 483/30
See application file for complete search history.

(56) References Cited

U.S. PATENT DOCUMENTS

| 1,759,333 | A |   | 5/1930  | Wildhaber |
| 2,720,062 | A |   | 10/1955 | Fouquet |
| 4,357,928 | A | * | 11/1982 | Hopkins .................... 125/11.09 |
| 4,535,573 | A | * | 8/1985  | Mesey et al. ...................... 451/5 |
| 5,954,568 | A | * | 9/1999  | Wirz ............................... 451/47 |
| 2005/0171631 | A1 | * | 8/2005 | Arvin ............................. 700/182 |
| 2006/0014474 | A1 | * | 1/2006 | Yanase et al. ..................... 451/5 |

FOREIGN PATENT DOCUMENTS

| EP | 0485339 | 5/1992 |
| FR | 1577400 | 2/1970 |

\* cited by examiner

*Primary Examiner* — Mohammad Ali
*Assistant Examiner* — Sheela S Rao
(74) *Attorney, Agent, or Firm* — Dilworth & Barrese, LLP.

(57) ABSTRACT

The present invention relates to a method for operating a gear grinding machine, with the following operating phases of the gear grinding machine: machining a workpiece on the gear grinding machine by means of a grinding disk and/or grinding worm and dressing a profiling tool for profiling a grinding disk and/or grinding worm on the gear grinding machine.

37 Claims, 4 Drawing Sheets

PRIOR ART

METHOD FOR OPERATING A GEAR GRINDING MACHINE

BACKGROUND OF THE INVENTION

The present invention relates to a method for operating a gear grinding machine. Such gear grinding machines are used for machining a workpiece on the gear grinding machine by means of a grinding disk and/or grinding worm.

In the production of gear wheels, gear grinding machines are used for hard finishing premachined gear wheels, in order to provide them with their final geometry. In the production of gear wheels, teeth usually are first formed from a rotationally symmetric workpiece in a soft premachining step, e.g. by milling or slotting. Then, the workpiece premachined in this way is subjected to a heat treatment, by means of which at least the regions of the gear wheel located near the surface of the teeth are hardened. To compensate the changes in the surface geometry which occur during the heat treatment and to fabricate the surface geometry of the teeth with greater precision, hard finishing is performed on the gear grinding machine. There is used a grinding disk or a grinding worm, with which the workpiece is machined and which provides the same with its final geometry.

Such gear grinding machine is shown in FIG. 1. The same includes a workpiece fixture 3, in which a workpiece 6 can be clamped. The workpiece fixture 3 is rotatable about the axis C2, which advantageously is vertically aligned. Alternatively, however, horizontally aligned workpiece fixtures can also be used. The gear grinding machine furthermore includes a work spindle 5 for clamping a tool. One or more grinding disks and/or one or more grinding worms 1 can be clamped into this work spindle 5. The work spindle 5 can be rotated by the motor 8, wherein the axis of rotation B1 of the work spindle 5 can be swivelled in a plane which extends parallel to the axis of rotation of the workpiece fixture 3. For this purpose, the work spindle 5 can be swivelled about a swivel axis A1, which is vertical to the plane in which the axis of rotation B1 of the work spindle 5 extends, and which also extends vertical to the axis of rotation of the workpiece fixture 3. Furthermore, the work spindle 5 can be shifted linearly in the direction of its axis of rotation B1, i.e. along the arrow V1. Furthermore, the work spindle 5 can be moved linearly in a direction parallel to the axis of rotation C2 of the work spindle 5, i.e. along the arrow Z1. The work spindle also can be moved linearly in a direction vertical to the axis of rotation C2 of the workpiece fixture 3, i.e. along the arrow X1, in order to move the grinding disk or grinding worm 1 clamped into the work spindle 5 towards the workpiece clamped into the workpiece fixture 3 or to move it away from the same or to achieve specific corrections. Machining the workpiece with the grinding disk or grinding worm usually is effected by generation grinding or profile grinding or a combination thereof.

The developments made in gearbox construction for transmitting higher power densities with lower noise emission lead to increasingly complex gear geometries or gear topologies of gear wheels. Owing to this modification of the gear geometries, the gear-tooth contact patterns can be optimized under various load conditions, and the thrust and tensile loads between the meshing teeth can be improved. There is a trend towards increasingly complex gear wheel geometries, which must be produced in shorter and shorter reaction times in smaller batch sizes.

To adapt the grinding disks or grinding worms to the desired geometry of the gear wheel and/or to compensate the wear of a grinding disk and/or grinding worm, the grinding disk or grinding worm must be dressed in regular intervals during operation for adjustment to a new geometry of the workpiece. Dressing or trueing a grinding disk and/or grinding worm comprises the actual profiling, i.e. generating the required geometry of the grinding disk and/or grinding worm (concentricity, cylindricity, profile), and sharpening, i.e. generating a high-cutting grinding surface (microgeometry), and subsequently continuously is referred to as profiling for reasons of clarity. Subsequently, the tool used for profiling a grinding disk or grinding worm correspondingly is referred to as profiling tool.

For profiling grinding disks and grinding worms, in particular cylindrical uncorrected grinding worms and cylindrical modified grinding worms, different profiling tools are used. FIGS. 2 to 4 show such profiling tools 2, which are used for profiling a grinding worm 1. In FIG. 2, rotationally symmetric profiling tools are shown, and in FIG. 3 a profiling tool in the form of a gear wheel which also is referred to as profiling gear (master gear). FIG. 4 shows further rotationally symmetric profiling tools with more complex geometries.

Profiling the grinding disks or grinding worms can be effected on the gear grinding machine, i.e. on the production machine, on which the gear wheels also are machined. For this purpose, the profiling tools on the gear grinding machine, as shown in FIG. 1, are mounted on a profiling spindle, are driven by the same and, if necessary, can selectively be swivelled about their clamping axis. The profiling spindle 4 of FIG. 1 can be driven about the axis of rotation B3, which extends vertical to the axis of rotation C2 of the workpiece fixture. In addition, the profiling spindle 4 can be swivelled about the swivel axis C5, which extends parallel to the axis of rotation C2 of the workpiece fixture 3. Furthermore, the profiling spindle 4 is linearly movable in a direction which extends parallel to the axis of rotation C2 of the workpiece fixture 3, i.e. along the arrow Z4. During profiling, the grinding disk or grinding worm to be profiled likewise is driven and selectively swivelled towards the profiling tool, so that profiling the grinding worm can be effected in normal cut. Profiling the grinding worm is performed either single-flank or dual-flank in several passes, and if necessary the profile flanks can be profiled in different ways and variable along the worm length, in order to produce a so-called three-dimensionally modified grinding worm.

The grinding disks or grinding worms for grinding the workpiece usually are made of bound hard material grain, e.g. corundum or a corundum modification, or of ceramically bound or galvanically bound boron nitride. The accuracy of the profiling of the grinding disk or grinding worm determines the accuracy of the gear teeth to a large extent. The profiling tools used in the prior art usually are coated with a single layer of hard material and preferably are galvanically positively or galvanically negatively coated with diamond or cubic boron nitride and also are subsequently conditioned mechanically, in order to meet the required high final quality in terms of profile geometry and tool life. Manufacture usually requires a basic metallic body, which likewise must be manufactured mechanically in close quality, a chemical or electrochemical coating process and, if necessary, an accurate mechanical finishing, i.e. profiling or dressing the profiling tool. Trueing or dressing a profiling tool, which in turn comprises the actual profiling, i.e. generating the required geometry of the profiling tool (concentricity, cylindricity, profile), and sharpening, i.e. generating a high-cutting profiling surface (microgeometry), subsequently continuously is referred to as dressing, in order to avoid confusions with the profiling of a grinding disk and/or grinding worm. The tool used for dressing a profiling tool likewise continuously is referred to as dressing tool.

The process for manufacturing known profiling tools is a multistage and time-consuming process, the tool produced has a predefined geometry, which must accurately be matched between the tool supplier and the customer and should be preserved over a long service life. Manufacture is ensured by a small number of specialized tool manufacturers worldwide. Due to the specific procedure, the tools are relatively expensive and have considerable terms of delivery. For dressing or recoating and dressing, the tools must be sent back to the manufacturer and a so-called recoating or resharpening process is started. In such process, changes in the geometry of the profiling tools can also be performed within certain limits at certain costs.

The disadvantages of the tool systems available so far consist in that changes in the profile geometry of the customer workpiece, which cannot be accomplished by swivelling or by selective feeding when dressing the grinding worm, only can be produced by so-called line dressing. However, this method involves the disadvantage that the line-shaped pre-, finish- and postprofiling of a cylindrical grinding worm is very time-consuming due to the multitude of individual profiling steps and therefore is only partly suitable for grinding recurring batch sizes on the production machine.

SUMMARY OF THE INVENTION

Therefore, it is the object of the present invention to provide a method which enables gear wheel manufacturers to produce gear wheels with different geometry and topology at short notice, flexibly and at low cost.

In accordance with the invention, this object is solved by a method according to the description herein. The invention relates to a method for operating a gear grinding machine. As operating phases of the gear grinding machine, the method of the invention includes the machining of a workpiece on the gear grinding machine by means of a grinding disk and/or grinding worm and the dressing of a profiling tool for profiling a grinding disk and/or grinding worm on the gear grinding machine. Dressing the profiling tool, which is used for profiling a grinding disk and/or grinding worm of a gear grinding machine, is effected on the gear grinding machine in accordance with the invention. By dressing the profiling tool on the gear grinding machine, i.e. on the production machine, on which machining of the gear wheels is effected by the grinding disk or grinding worm, it is possible to manufacture profiling tools of different geometries at short notice and at low cost, which profiling tools in turn can be used for profiling grinding disks or grinding worms of different geometries. By means of the method of the invention it is furthermore possible to quickly and inexpensively remachine profiling tools, in order to compensate wear on the profiling tool. After several uses of the profiling tool for profiling the grinding disk or grinding worm and after the occurrence of wear, the profiling tool can be dressed on the gear grinding machine itself. If changes in the profile geometry are desired and required, the profiling tool can also be modified already before the end of the service life by dressing with changed NC data.

Such profiling tool can be used for profiling a cylindrical or three-dimensional modified grinding worm with corresponding profiling parameters. If necessary, it can furthermore be used twice or several times for separate worms (roughing/smoothing).

Advantageously, the present invention furthermore comprises a method with the following operating phases of the gear grinding machine: profiling a grinding disk and/or grinding worm on the gear grinding machine by means of a profiling tool and dressing a profiling tool for profiling a grinding disk and/or grinding worm on the gear grinding machine. This also provides for a correspondingly increased flexibility of the production process. Advantageously, the method of the invention includes all three operating phases, so that both grinding, profiling and dressing are effected on the gear grinding machine, which correspondingly saves costs.

Due to the method of the invention, a single gear grinding machine is sufficient for the entire production process, in that on the gear grinding machine the profiling tools are dressed, which on the same gear grinding machine then are used for profiling the grinding disk and/or grinding worm mounted on this gear grinding machine. However, a plurality of gear grinding machines can of course also be used, so that a profiling tool need not necessarily be dressed on the same gear grinding machine on which it is also used for profiling and/or on which the grinding disk and/or grinding worm profiled by means of the profiling tool is used. A decisive advantage of the present method, however, always consists in that an individual gear grinding machine alternately operates in the dressing mode, in the profiling mode and/or in the grinding mode, so that an excellent flexibility and machine utilization is obtained.

On a gear grinding machine, on which dressing the profiling tool is effected in accordance with the invention, a workpiece clamped into a workpiece fixture advantageously is machined in the grinding mode by means of a grinding disk and/or grinding worm clamped into a work spindle. Beside the usual machining of workpieces, i.e. gear wheels, the gear grinding machine thus is also used for dressing the profiling tool.

On a gear grinding machine, on which dressing the profiling tool is effected in accordance with the invention, a grinding disk or grinding worm clamped into a work spindle furthermore advantageously is profiled in the profiling mode with a profiling tool clamped into a profiling spindle. On the gear grinding machine, on which profiling the grinding worm is effected beside machining the workpiece, dressing the profiling tool hence can also be effected in accordance with the invention.

Furthermore advantageously, a separate dressing spindle can be used for the dressing mode. As a result, the user need not specially rechuck the dressing tool for dressing a profiling tool. The dressing spindle advantageously can be arranged in the vicinity of the profiling spindle, in particular above the profiling spindle, and be moved and/or swivelled with the same, or be arranged in the vicinity of the work spindle, in particular on the work head, and be moved, swivelled and/or shifted with the same.

Alternatively, however, dressing can also be effected by means of the spindles already provided for the grinding mode and/or the profiling mode.

Depending on the geometry of the profiling tool, different methods are obtained, with which the profiling tool can be dressed on the gear grinding machine in accordance with the invention.

The present invention therefore comprises a method, in which for dressing a rotationally symmetric profiling tool the profiling tool clamped into the work spindle is dressed by means of a dressing tool clamped into the profiling spindle of the gear grinding machine, or the profiling tool clamped into the profiling spindle of the gear grinding machine is dressed by means of a dressing tool clamped into the work spindle of the gear grinding machine. By means of the NC axles of the work spindle and the profiling spindle, all desired profile corrections and modifications can be produced on the profiling tool to be dressed. The profiling tool is pre-, finish- and remachined in an optimum dressing ratio.

As an alternative to dressing a rotationally symmetric profiling tool, the profiling tool clamped into the workpiece fixture can be dressed with a dressing tool clamped into the work spindle of the gear grinding machine. The axis of rotation of the work spindle advantageously is aligned substantially parallel to the axis of rotation of the workpiece fixture, so that a situation comparable with rotor milling is obtained.

If an additional dressing spindle is employed, the same advantageously is used and moved analogous to the work spindle or profiling spindle, depending on where the dressing spindle is arranged.

In a furthermore advantageous way, the profiling tool and/or the dressing tool are rotated about the respective spindle axes of rotation. In a furthermore advantageous way, the contour of the profiling tool is scanned with the further machine axles, in particular by swivelling, shifting and/or advancing the work spindle and/or by swivelling the profiling spindle and/or by correspondingly moving the dressing spindle. By free choice of the NC-controlled path contour, all possible profile modifications and corrections can be produced on the profiling tool, so that this tool later on can be used on the gear grinding machine for profiling profitable grinding worms and profitable grinding disks, in order to provide the same with the desired geometries.

As tools for dressing the profiling tool, there is either used a forming roller, i.e. a tool with a defined head radius or, if necessary, with a reduced defined head radius. This tool is clamped on the profiling spindle, by which the speed and direction of rotation can be determined, in order to dress a profiling tool clamped into the work spindle, which then can be brought in contact with the dressing tool by swivelling the work spindle in normal cut. Alternatively, the profiling tool to be dressed can also be clamped on the profiling spindle, by which the speed and direction of rotation selectively is defined, wherein the profiling spindle possibly can be swivelled about its swivel axis. The dressing tool then is clamped on the work spindle and driven by the same, shifted on the same, and the direction of rotation is freely chosen. As dressing tool, there is preferably again used a forming roller with a defined head radius or with a reduced defined head radius. If an additional dressing spindle is used, the same replaces the work spindle or profiling spindle in the procedure described, depending on where the dressing spindle is arranged.

For dressing, the dressing tool and the profiling tool advantageously are brought in point contact with each other in a defined, optimized speed ratio, wherein the profiling tool or dressing tool clamped into the profiling spindle can selectively be swivelled, if necessary, in order to bring in contact the optimum point of the dressing tool on each contact point and ensure a high final accuracy.

Due to the NC axles, by which the work spindle can be moved, any desired path can selectively be scanned, so that the head radius of the profiling tool, the profile shape, e.g. crown, tip relief, root relief, and the radius on the head profiling tool are produced. Dressing is effected with very small amounts, in order to save the profiling tool and the dressing tool and provide for a long service life.

The present invention furthermore comprises a method, in which for dressing a profiling tool which has the shape of a gear wheel the profiling tool clamped into the workpiece fixture is dressed with a dressing tool clamped into the work spindle of the gear grinding machine. In this way, a profiling gear wheel can also be dressed on the gear grinding machine of the invention.

Dressing the profiling tool advantageously is effected by generation grinding, in particular partial generation grinding and/or profile grinding.

Advantageously, the profiling tool is clamped into the workpiece fixture, rotated and positioned, and the dressing tool clamped into the work spindle is rotated.

In a furthermore advantageous way, the dressing tool clamped into the work spindle is swivelled and shifted, wherein the working stroke is effected by a movement of the work spindle in a direction parallel to the axis of rotation of the workpiece fixture, and the dressing tool is moved towards the profiling tool by a movement of the work spindle in a direction vertical to the axis of rotation of the workpiece fixture. For pre-, finish- and remachining helical gears, coupling of the individual axles advantageously can be effected. Dressing advantageously is effected single-flank or dual-flank by means of a partial generation or profile grinding method.

If an additional dressing spindle is used, which is arranged in the vicinity of the work spindle, the same advantageously replaces the work spindle in the method described above, i.e. is used and moved analogous to the same.

In a furthermore advantageous way, profiling tools with a multilayer coating of hard material are dressed in the method of the invention. The multilayer coating of hard material can be homogeneous, but can also be different due to type, density, bond and different grains of hard material, in order to account for the future wear behavior of the profiling tool. Advantageously, e.g. a wear reinforcement can be provided on the tool head.

The profiling tools have a multilayer coating of hard material and have a certain amount of hard material coating for redressing. As basis of a rotationally symmetric profiling tool, a rotationally symmetric starting body is used. As basis of a profiling gear wheel, there is either used a gear wheel with a multilayer coating of hard material, which is straight-toothed or helically toothed, or a disk-shaped cylindrical starting body, which then is dressed correspondingly. Such disk-shaped, cylindrical starting body advantageously is only used when the gear wheel modulus is limited and hence the volume to be dressed is small.

In a furthermore advantageous way, a dressing tool coated with hard material is used for dressing the profiling tool. As dressing tools, hard-material-coated profile grinding disks advantageously are used for single- or dual-flank grinding. Further hard-material-coated dressing tools can also be used. There can also be used a combination of several dressing tools, wherein e.g. a partial generation grinding step and a profile grinding step each are performed with different tools.

In a furthermore advantageous way, the profiling tool is surveyed on the gear grinding machine in accordance with the invention. The survey data of the profiling tool obtained thereby, which indicate the geometry or topology of the profiling tool, then can be used in many ways for controlling the gear grinding machine.

Advantageously, the survey data obtained in the survey are stored. Advantageously, the wear of the profiling tool is monitored in accordance with the invention by means of the survey data. In this way, it can be ensurd that the profiling tool always has the desired geometry and is newly dressed in time in the case of wear.

In a furthermore advantageous way, the use of the profiling tool for profiling the grinding disk or grinding worm is effected on the basis of the survey data in accordance with the invention. In this way, a possible wear of the profiling tool upon profiling the grinding disks or grinding worms can be taken into account, so that the accuracy of the profiling of the grinding worm is increased.

In a furthermore advantageous way, dressing the profiling tool is effected on the basis of the survey data. Such feedback of the survey data to the machine control for use of the dresser when pre-, finish- and redressing the profiling tool allows a particularly exact dressing of the profiling tools.

For surveying purposes, the profiling tool advantageously is clamped into the profiling spindle and scanned by a scanning head in accordance with the invention. In an advantageous way, the scanning head is arranged on the grinding head of the gear grinding machine. By surveying in accordance with the invention, the final quality produced can be documented and, if necessary, a further dressing step can be performed selectively. The same testing method can also be used for monitoring wear and be employed in specified intervals.

The present invention furthermore comprises a gear grinding machine for machining a workpiece by means of a grinding disk and/or grinding worm and for dressing a profiling tool, with a control for performing a method as described above. In particular, the method of the invention is performed with the aid of a computer. Due to the fact that the profiling tool can be dressed on the gear grinding machine of the invention, the same advantages are obtained as described already above with respect to the corresponding method. For performing the method of the invention, the control of the gear grinding machine advantageously includes corresponding control routines, input/output functions and/or operator prompts.

The gear grinding machine of the invention advantageously includes a workpiece fixture for clamping a workpiece and a work spindle for clamping a grinding disk or grinding worm.

In a furthermore advantageous way, the workpiece fixture can be rotated about an axis of rotation, and the work spindle can be moved in a direction parallel to the axis of rotation of the workpiece fixture and in a direction vertical to the axis of rotation of the workpiece fixture.

In a furthermore advantageous way, the work spindle of the gear grinding machine of the invention can be shifted in the direction of its axis of rotation and be swivelled about a swivel axis which extends vertical to the axis of rotation of the workpiece fixture.

Due to the corresponding fixtures and spindles and the movability thereof, a workpiece can be machined on the gear grinding machine by means of a grinding disk and/or grinding worm like in the prior art, and a profiling tool can be dressed in accordance with the invention.

The gear grinding machine of the invention furthermore advantageously comprises a profiling spindle for clamping a profiling tool.

Advantageously, the profiling spindle can be moved in a direction parallel to the axis of rotation of the workpiece fixture and be swivelled about a swivel axis which extends parallel to the axis of rotation of the workpiece fixture. In this way, the grinding disk or grinding worm can be profiled on the gear grinding machine of the invention like in the prior art, and the profiling tool can be dressed in accordance with the invention.

The gear grinding machine of the invention advantageously includes a dressing spindle for clamping a dressing tool. With such separate dressing spindle, which in particular is provided beside the work spindle, the profiling spindle and the workpiece fixture, the rechucking process is not necessary for the user when dressing a profiling tool.

Advantageously, the dressing spindle is arranged in the vicinity of the profiling spindle, in particular above the profiling spindle, and can be moved and/or swivelled with the same, or the dressing spindle is arranged in the vicinity of the work spindle, in particular on the work head, and can be moved, swivelled and/or shifted with the same. In this way, merely the dressing spindle and the drive thereof must be provided for the dressing operation, whereas the other movements are performed by the already existing NC axles of the gear grinding machine.

Alternatively, however, a separate dressing spindle can also be omitted, and dressing can be effected by the already existing NC axles of the gear grinding machine alone.

Advantageously, the gear grinding machine comprises a working mode, in which a workpiece is machined by means of a grinding disk and/or grinding worm. For this purpose, the control of the gear grinding machine advantageously comprises a corresponding operator prompt. In a furthermore advantageous way, the gear grinding machine of the invention furthermore comprises a dressing mode for dressing a profiling tool used for profiling a grinding disk or grinding worm. Beside machining the workpiece and possibly profiling a grinding disk, dressing the profiling tool thereby can be effected on the gear grinding machine of the invention, wherein a corresponding dressing mode and advantageously a corresponding operator prompt are provided in the control of the gear grinding machine.

In a furthermore advantageous way, the gear grinding machine of the invention also includes a surveying mode, in which a profiling tool is surveyed. In accordance with the invention, a profiling tool thus can not only be dressed, but can also be surveyed on the gear grinding machine, for which purpose the control of the gear grinding machine of the invention includes a corresponding surveying mode and advantageously a corresponding operator prompt.

In a furthermore advantageous way, the control of the invention includes one or more operating modes and/or an operator prompt for performing a method as already described above. This in turn provides the advantages indicated above with respect to the method.

The present invention furthermore comprises a control software for a gear grinding machine, in particular a control software with program code, which is stored in a data memory or on a data carrier, for performing a method as described above. This again provides the advantages of the invention. The control software can for instance also be loaded onto existing gear grinding machines, in order to perform the method of the invention on the same. The control software advantageously includes the corresponding operating modes and operator prompts.

The present invention furthermore comprises a profiling tool for profiling a grinding disk or grinding worm of a gear grinding machine with a multilayer coating of hard material for repeatedly dressing by means of a method as described above. As a result, such profiling tool is extremely inexpensive, flexible and can quickly be remachined and adapted to new gear geometries in the case of wear. The multilayer coating of hard material can be homogeneous, but can also be different due to type, density, bond and different grains of hard material, in order to account for the future wear behavior of the profiling tool. Advantageously, e.g. a wear reinforcement can be provided on the tool head. The profiling tool can either be rotationally symmetric or have the shape of a gear wheel, wherein such profiling gear wheel can be straight-toothed or helically toothed.

The present invention furthermore comprises the use of a gear grinding machine for performing a method as described above. This in turn provides the advantages described above with respect to the method.

Furthermore, the present invention comprises the use of a dressing tool and/or a profiling tool for performing a method as described above. In particular, the present invention thus comprises the use of a dressing tool for dressing a profiling tool on a gear grinding machine and the use of a profiling tool which is dressed on a gear grinding machine.

BRIEF DESCRIPTION OF THE DRAWINGS

The present invention will now be explained in detail with reference to embodiments and drawings, in which.

DESCRIPTION OF THE PREFERRED EMBODIMENTS

Figure 1:
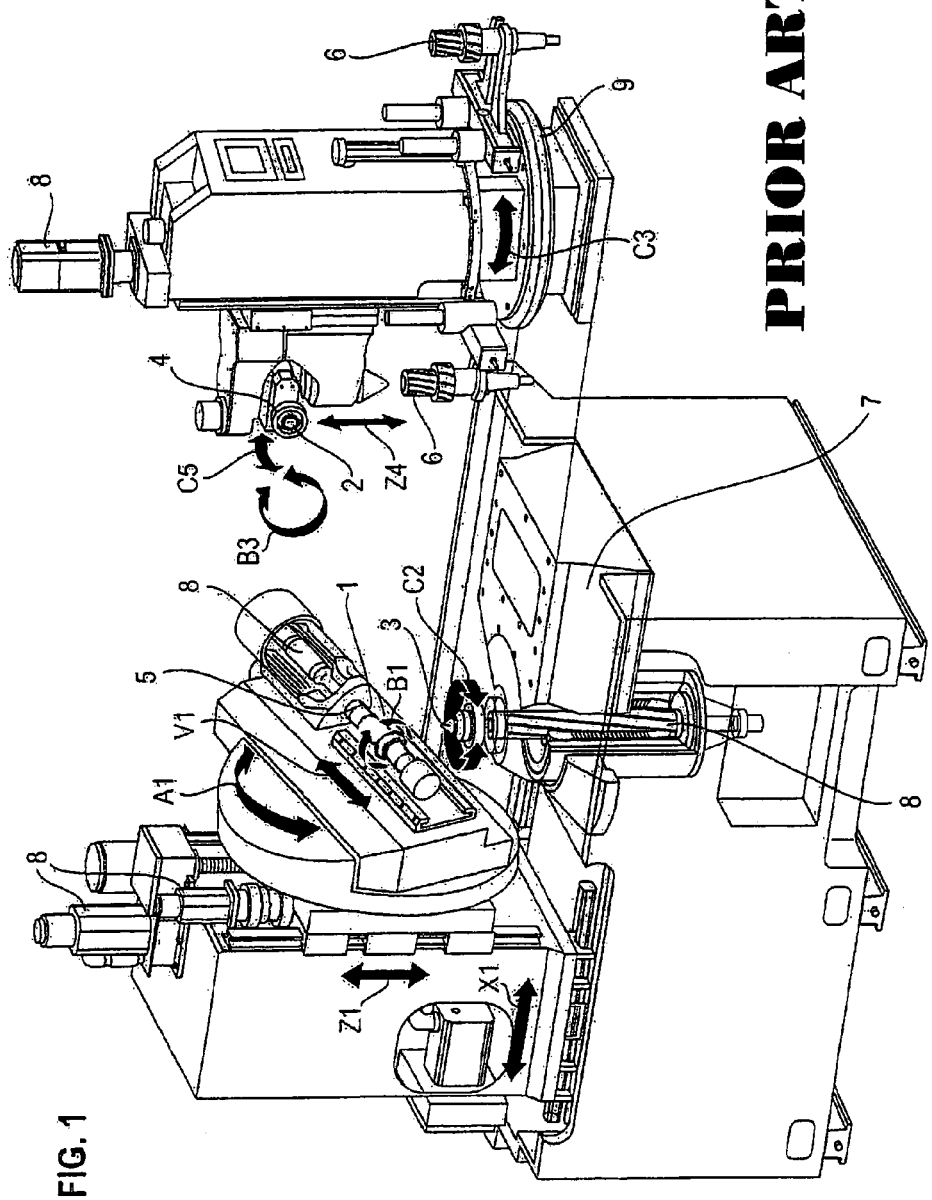
FIG. 1: shows a prior art embodiment of a gear grinding machine.
Figure 2:
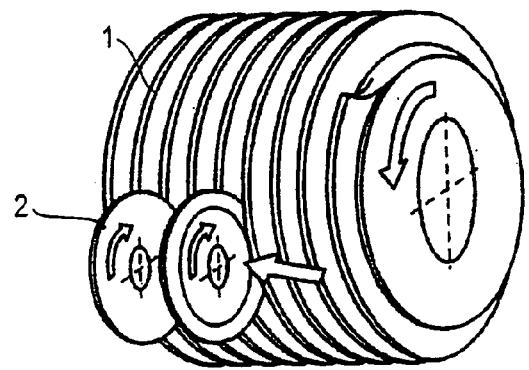
FIG. 2: shows the prior art profiling of a grinding worm with rotationally symmetric profiling tools.
Figure 3:
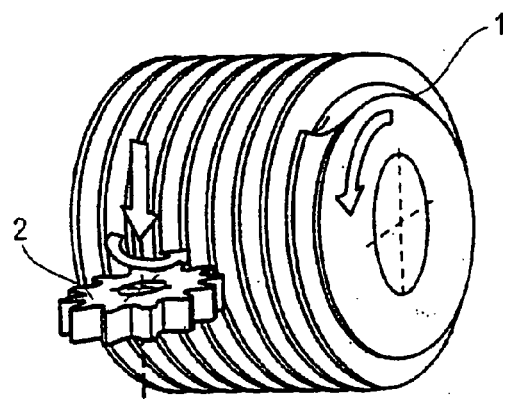
FIG. 3: shows the prior art profiling of a grinding worm with a profiling gear wheel.
Figure 4:
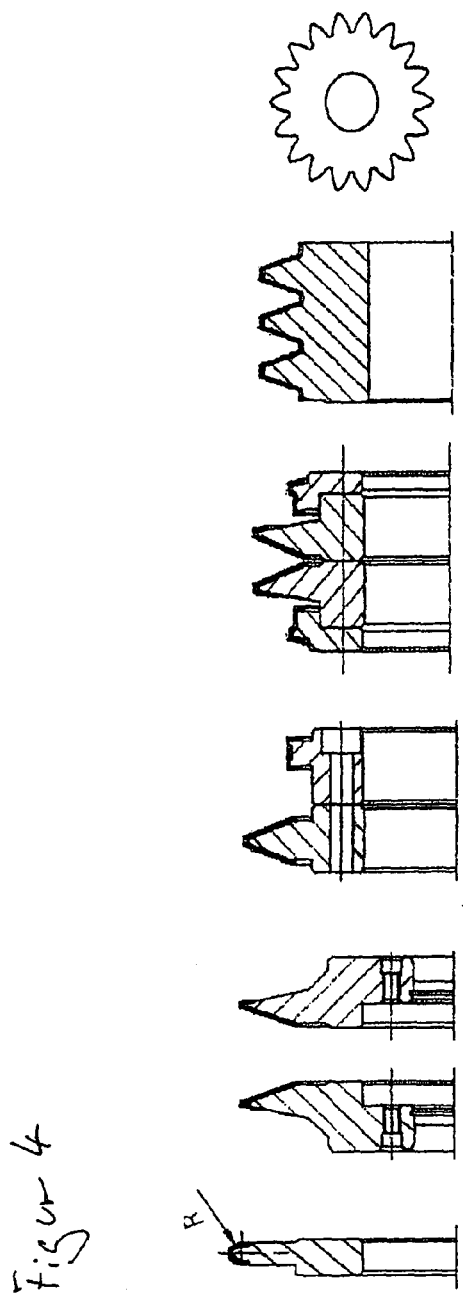
FIG. 4: shows alternative prior art rotationally symmetric profiling tools with a more complex geometry.
Figure 5:
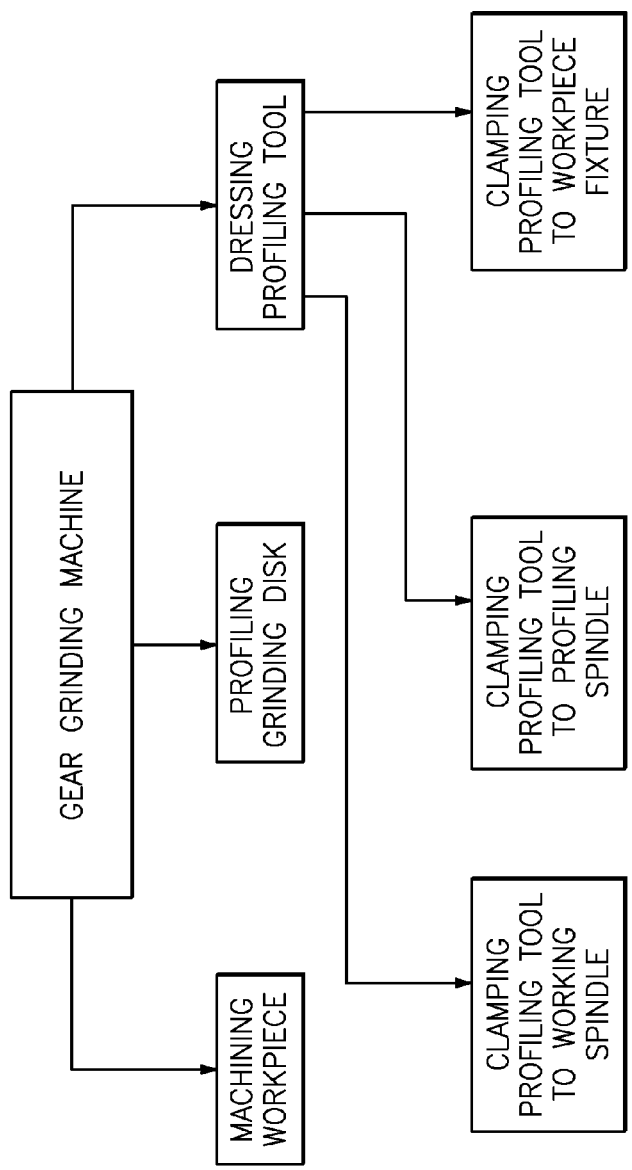
FIG. 5: shows a schematic flow chart illustrating the method in accordance with the present invention.

The general configuration of the gear grinding machine, as it is shown in FIG. 1, has already been described above with respect to the prior art. Such gear grinding machine now is also used for performing the method of the invention, wherein the control of the gear grinding machine advantageously is designed for performing this method, in particular as it includes corresponding operating modes and a corresponding operator prompt.

In the following, two embodiments are described for dressing a profiling tool on such gear grinding machine in accordance with the invention.

In the first embodiment of the method of the invention for dressing a profiling tool on the gear grinding machine, a rotationally symmetric profiling tool with a multilayer coating of hard material is clamped on the grinding head of the gear grinding machine, i.e. in the work spindle $5$, and driven about the axle B1. The speed and direction of rotation can selectively be controlled by the drive of the axle B1. By means of the axle A1, the profiling tool in normal cut can be brought in contact with the dressing tool, which is mounted on the profiling spindle $4$.

As a tool for dressing, there is used a forming roller either with a defined head radius or, if necessary, with a reduced defined head radius. This tool is coated with hard material and is clamped into the profiling spindle, wherein the speed and direction of rotation about the axle B3 is determined when the profiling tool to be dressed is clamped into the work spindle.

It is, however, also possible to clamp the profiling tool with a multilayer coating of hard material on the profiling spindle and selectively define the speed and direction of rotation of the axle B3 and, if necessary, swivel the profiling tool with a multilayer coating of hard material about the axle C5 of the profiling spindle. In this case, the dressing tool is clamped into the work spindle, driven about the axle B1 and shifted, wherein the direction of rotation can freely be chosen.

For dressing, the dressing tool and the profiling tool can be brought in point contact with each other in a defined, optimized speed ratio, wherein, if necessary, the dressing or profiling tool can selectively be swivelled about the axle C5 of the profiling spindle, so that for each contact point the optimum point of the dressing tool is brought in contact and a high final accuracy is ensured.

The NC axles V1, Z1 and X1 then can selectively scan any desired path, so that the head radius of the profiling tool, the profile shape such as e.g. crown, tip relief and root relief, and the radius at the head dresser can be produced. Profiling is effected with very small amounts, in order to save the profiling tool and the dressing tool and provide for a long service life of the profiling tool.

For checking the geometry of the profiling tool manufactured, the same can be clamped on the profiling spindle before profiling a grinding worm, and can be scanned in X- and V-direction by means of a scanner which is mounted on the grinding head and be surveyed therewith, in order to document the final quality produced and, if necessary, perform a further dressing step. This testing method can also be used for monitoring wear and be used in specified intervals, e.g. after a specified number of profiling operations of the grinding worm.

After several uses of the profiling tool and upon occurrence of wear, the tool is remachined by renewed dressing. If changes in the profile geometry are desired and required, the profiling tool can be modified already before the end of its service life by dressing with changed NC data.

A profiling tool thus manufactured can be used for profiling a cylindrical or three-dimensional modified grinding worm with corresponding profile parameters. If necessary, it can furthermore be used for separate worms, e.g. for roughing or smoothing, also twice or several times.

In the following, a second embodiment of the dressing of a profiling gear in accordance with the invention will now be illustrated. A gear wheel with a multilayer coating of hard material, which is straight-toothed or helically toothed, will be used as a basis. Furthermore, it is possible to use a disk-shaped, cylindrical blank as starting body, when the gear wheel modulus is limited and the volume to be removed is small.

In accordance with the invention, this profiling gear wheel or this blank are clamped on the workpiece fixture and thus can selectively be rotated and positioned about the axle C2. The dressing tool is clamped on the work spindle and moved by the corresponding NC axles of the gear grinding machine.

As dressing tools for dressing the profiling gear, hard-material-coated profile grinding disks for single- or dual-flank grinding are used. Further hard-material-coated profiling tools or profile grinding disks can also be used.

For dressing the profiling gear wheel, partial generation grinding (point contact) or profile grinding (full mold contact) advantageously is used for pre-, finish- and remachining. Either single-flank or dual-flank grinding is employed. There can also be used a combination of the two methods, wherein a plurality of identical or different tools can be clamped on the work spindle for dressing the profiling gear wheel.

Surveying the profiling gear wheel is effected like surveying the above-described rotationally symmetric profiling tool, in that the profiling gear wheel is clamped on the profiling spindle and scanned by a scanning head which is arranged on the grinding head. The profiling gear wheel thus can be checked, and the data obtained can be coupled back to the machine control. These data in turn support the profiling operation and in future uses of the profiling gear wheel serve for exactly profiling the grinding worm.

In summary, the two embodiments will now briefly be compared again:

As a first embodiment of the method of the present invention, a method for pre-, finish- or remachining a disk-shaped profiling tool in the gear grinding machine has been described. In this method, the profiling tool with a multilayer coating of hard material is clamped into the work spindle of the gear grinding machine and pre-, finish- and remachined in an optimum dressing ratio with a hard-material-coated dressing tool, which is clamped on the profiling spindle of the gear grinding machine. Both tools are rotated by the respective spindle axes of rotation, and the contour of the profiling tool is scanned with the further NC machine axles under path control. There is a point contact between the profiling tool and the dressing tool. Due to the free choice of the NC-controlled path contour, all possible profile changes and corrections can be produced on the profiling tool, so that later on this tool can be used on the gear grinding machine for profiling grinding worms and grinding disks. Alternatively, the disk-shaped profiling tool can also be clamped into the profiling spindle and the dressing tool into the work spindle.

In a second embodiment, a method for manufacturing a profiling gear wheel has been described, which has a multilayer coating of hard material and is pre-, finish- and remachined with a hard-material-coated dressing tool on the gear grinding machine. For this purpose, the straight-toothed or helically toothed profiling gear wheel is clamped on the machine table as workpiece and dressed with a dressing tool under NC control, wherein the dressing tool used for this purpose is positioned on the work spindle of the grinding machine. By choosing the discontinuous generation grinding (partial generation grinding) with single-flank or dual-flank grinding and/or the single-flank or dual-flank discontinuous profile grinding each with hard-material-coated dressing tools as dressing method, profiling gear wheels with or without selective profile and tooth direction corrections can be produced. On the gear grinding machine, these profiling gear wheels are used for pre- or finish-profiling cylindrical grinding worms, which in turn are used for gear grinding uncorrected or topologically modified transmission gear wheels.

As an alternative to the illustrated embodiment, a separate dressing spindle can also be provided. The dressing spindle is arranged either in the vicinity of the profiling spindle, in particular above the profiling spindle, and can be moved and/or swivelled with the same, or in the vicinity of the work spindle, in particular on the work head, and can be moved, swivelled and/or shifted with the same. The methods described above then are performed analogously, wherein either the work spindle or the profiling spindle each is replaced by the dressing spindle.

The present invention furthermore comprises rotationally symmetric profiling tools, which are used for profiling the screw channel and/or the screw channel and the screw head. The tools have a multilayer coating of hard material and include a certain amount for repeated dressing. The hard material coating either is a multilayer homogeneous coating, but can also be different due to type, density and bond and different grains of hard material, in order to account for the future wear behavior of the tool (e.g. wear reinforcement on the tool head).

Correspondingly, the present invention likewise comprises a profiling gear wheel with a multilayer coating of hard material, which is straight-toothed or helically toothed and due to pre-, finish- and remachining by the present invention is used for profiling a grinding worm. The multilayer coating of hard material again can be homogeneous or can also be different due to type, density, bond and different grains of hard material, in order to account for the future wear behavior of the tool (e.g. wear reinforcement on the tool head).

The present invention likewise comprises surveying the hard-material-coated profiling tool on the gear grinding machine. The tool geometries are used for monitoring wear, are coupled back to the machine control for the use of the tool, and are used for pre-, finish- and remachining the profiling tool. For the future profiling of cylindrically modified and unmodified grinding worms, the data in particular represent the basis of the NC control.

The present invention likewise comprises a corresponding control software, which is used for performing the method of the invention on a gear grinding machine.

In the present description, the profiling or dressing of a grinding disk or grinding worm continuously was referred to as profiling, and the tool used for this purpose as profiling tool, in order to avoid confusions. On the other hand, the profiling or dressing of such profiling tool continuously was referred to as dressing, the tool used for this purpose as dressing tool.

The invention claimed is:

1. A method for operating a gear grinding machine, comprising the following separate operating steps (1)-(3) of the gear grinding machine:
 (1) machining a workpiece clamped on a workpiece mount on the gear grinding machine with a grinding disk and/or grinding worm clamped on a working spindle,
 (2) separately profiling the grinding disk and/or grinding worm on the gear grinding machine with a profiling tool rotationally clamped on a profiling spindle, and
 (3) separately dressing the profiling tool for profiling the grinding disk and/or grinding worm on the gear grinding machine by one of the steps of
  (a) clamping the profiling tool on the working spindle and clamping a dressing tool on the profiling spindle,
  (b) clamping the profiling tool on the profiling spindle and clamping the dressing tool on the working spindle, or
  (c) clamping the profiling tool on the tool mount and clamping the dressing tool on the working spindle, wherein
 all three steps (1)-(3) are carried out separately from one another on the grinding machine.

2. The method according to claim 1, wherein in the grinding mode of the gear grinding machine a workpiece clamped into a workpiece fixture is machined with a grinding disk and/or grinding worm clamped into a work spindle.

3. The method according to claim 1, wherein in the profiling mode of the gear grinding machine a grinding disk and/or grinding worm clamped into a work spindle is profiled with a profiling tool clamped into a profiling spindle.

4. The method according to claim 1, wherein a separate dressing spindle is used for the dressing mode.

5. The method according to claim 4, wherein the profiling tool and/or the dressing tool are rotated about the respective spindle axes of rotation.

6. The method according to claim 5, wherein the contour of the profiling tool is scanned with the further machine axles, in particular in that the work spindle is swivelled, shifted and/or advanced, and/or the profiling spindle is swivelled and/or the dressing spindle is moved correspondingly.

7. The method according to claim 1, wherein for dressing a profiling tool which has the shape of a gear wheel, the profiling tool clamped into the workpiece fixture is dressed with a dressing tool clamped into the work spindle of the gear grinding machine.

8. The method according to claim 7, wherein dressing is effected by generation grinding, in particular partial generation grinding and/or profile grinding.

9. The method according to claim 7, wherein the profiling tool is clamped into the workpiece fixture, rotated and positioned, and the dressing tool clamped into the work spindle is rotated.

10. The method according to claim 7, wherein the dressing tool clamped into the work spindle is swivelled and shifted, the working stroke is effected by a movement of the work spindle in a direction parallel to the axis of rotation of the workpiece fixture, and the dressing tool is moved towards the profiling tool by a movement of the work spindle in a direction vertical to the axis of rotation of the workpiece fixture.

11. The method according to claim 1 for dressing a profiling tool with a single-layer or multilayer coating of hard material.

12. The method according to claim 1, wherein the profiling tool is surveyed on the gear grinding machine.

13. The method according to claim 12, wherein the wear of the profiling tool is monitored by the survey data.

14. The method according to claim 12, wherein the use of the profiling tool for profiling the grinding disk and/or grinding worm is effected on the basis of the survey data.

15. The method according to claim 12, wherein dressing the profiling tool is effected on the basis of the survey data.

16. The method according to claim 12, wherein for surveying purposes the profiling tool is clamped into the profiling spindle and scanned by a scanning head.

17. The method according to claim 1, wherein for dressing the profiling tool a hard-material-coated dressing tool is used.

18. A control software for a gear grinding machine, in particular a control software stored in a data memory or on a data carrier, with a program code for performing a method according to claim 1.

19. A profiling tool for profiling a grinding disk and/or grinding worm of a gear grinding machine with a multilayer coating of hard material for repeatedly dressing by a method according to claim 1.

20. Use of a gear grinding machine for performing a method according to claim 1.

21. Use of a dressing tool and/or of a profiling tool for performing a method according to claim 1.

22. The method according to claim 1, wherein operating steps (1)(3) are all separately carried out on the same grinding machine.

23. A gear grinding machine for machining a workpiece by a grinding disk and/or grinding worm and for dressing a profiling tool, with a control for the in particular computer-aided performance of a method according to claim 1.

24. The gear grinding machine according to claim 23 with a workpiece fixture for clamping a workpiece and with a work spindle for clamping a grinding disk and/or grinding worm.

25. The gear grinding machine according to claim 24, wherein the workpiece fixture is rotatable about an axis of rotation and the work spindle is movable in a direction parallel to the axis of rotation of the workpiece fixture and in a direction vertical to the axis of rotation of the workpiece fixture.

26. The gear grinding machine according to claim 25, wherein the work spindle is shiftable in the direction of its axis of rotation and swivelable about a swivel axis which extends vertical to the axis of rotation of the workpiece fixture.

27. The gear grinding machine according to claim 25, with a dressing spindle for clamping a dressing tool.

28. The gear grinding machine according to claim 27, wherein the dressing spindle is arranged in the vicinity of the profiling spindle and is movable and/or swivelable with the same, or the dressing spindle is arranged in the vicinity of the work spindle and is movable, swivelable and/or shiftable with the same.

29. The gear grinding machine according to claim 23, with a profiling spindle for clamping a profiling tool.

30. The gear grinding machine according to claim 29, wherein the profiling spindle is movable in a direction parallel to the axis of rotation of the workpiece fixture and swivelable about a swivel axis which extends parallel to the axis of rotation of the workpiece fixture.

31. The gear grinding machine according to claim 23, with an operating mode in which a workpiece is machined by a grinding disk and/or grinding worm.

32. The gear grinding machine according to claim 23, with a profiling mode in which a grinding disk and/or grinding worm is profiled by a profiling tool.

33. The gear grinding machine according to claim 23, with a dressing mode for dressing a profiling tool used for profiling a grinding disk and/or grinding worm.

34. The gear grinding machine according to claim 23, with a surveying mode in which a profiling tool is surveyed.

35. The gear grinding machine according to claim 23, wherein the control has one or more operating modes and/or an operator prompt.

36. The gear grinding machine according to claim 23, comprising
    a rotatably-mounted workpiece fixture on which a workpiece is clampable,
    a work spindle both rotatably and swivelably mounted and on which a grinding disk and/or worm is clampable, and
    a profiling spindle both rotatably and swivelably mounted and on which a profiling tool is clampable.

37. The gear grind machine according to claim 23, wherein
    a swiveling axis of the work spindle is substantially perpendicular to both an axis of rotation of the work spindle and an axis of rotation of the workpiece fixture, such that the axis of rotation of the work spindle is swivelable in a plane extending substantially parallel to the axis of rotation of the workpiece fixture,
    the work spindle is linearly movable in directions substantially parallel to its axis of rotation, substantially parallel to the axis of rotation of the workpiece fixture and substantially perpendicular to the axis of rotation of the workpiece fixture, and
    an axis of rotation of the profiling spindle is substantially perpendicular to the axis of rotation of the workpiece fixture, a swiveling axis of the profiling spindle is substantially parallel to the axis of rotation of the workpiece fixture and the profiling spindle is linearly movable in a direction substantially parallel to the axis of rotation of the workpiece fixture.

\* \* \* \* \*